US012798658B2

(12) United States Patent
Bartels et al.

(10) Patent No.: US 12,798,658 B2
(45) Date of Patent: Nov. 17, 2026

(54) STEERING SYSTEM ASSEMBLY AND VEHICLE COMPRISING A STEERING SYSTEM ASSEMBLY

(71) Applicants: Volkswagen Aktiengesellschaft, Wolfsburg (DE); Audi AG, Ingolstadt (DE)

(72) Inventors: Arne Bartels, Wolfsburg (DE); Frank Bärecke, Wolfsburg (DE); Hauke Schlimme, Braunschweig (DE); Kilian Förster, Beilgries (DE); Tobias Brok, Kösching (DE); Roger Ziegler, Neuburg (DE); Michael Sagefka, Kösching (DE); Martin Stolorz, Hannover (DE)

(73) Assignees: VOLKSWAGEN AKTIENGESELLSCHAFT, Wolfsburg (DE); AUDI AG, Ingolstadt (DE)

( * ) Notice: Subject to any disclaimer, the term of this patent is extended or adjusted under 35 U.S.C. 154(b) by 2 days.

(21) Appl. No.: 18/838,963

(22) PCT Filed: Feb. 17, 2023

(86) PCT No.: PCT/EP2023/054008

§ 371 (c)(1),
(2) Date: Sep. 23, 2024

(87) PCT Pub. No.: WO2023/156582

PCT Pub. Date: Aug. 24, 2023

(65) Prior Publication Data

US 2025/0196911 A1 Jun. 19, 2025

(30) Foreign Application Priority Data

Feb. 17, 2022 (DE) ..................... 10 2022 103 808.4

(51) Int. Cl.
*B62D 5/00* (2006.01)
*B60T 8/1755* (2006.01)
(Continued)

(52) U.S. Cl.
CPC ............ *B62D 5/003* (2013.01); *B60T 8/1755* (2013.01); *B60W 50/023* (2013.01); *B62D 9/005* (2013.01); *B60T 2260/02* (2013.01)

(58) Field of Classification Search
CPC ........ B62D 5/003; B62D 9/005; B62D 5/001; B60T 8/1755; B60T 2260/02; B60T 8/17; B60W 50/023
See application file for complete search history.

(56) References Cited

U.S. PATENT DOCUMENTS 9,718,363 B2 8/2017 Stemmer
10,137,875 B2 11/2018 Hecker et al.
(Continued)

FOREIGN PATENT DOCUMENTS

DE 102010034483 A1 2/2012 ................ B60L 3/00
DE 102019007715 A1 5/2021 ............... B62D 5/04
(Continued)

OTHER PUBLICATIONS

German Office Action, Application No. 102022103808.4, 12 pages, Sep. 20, 2022.
(Continued)

*Primary Examiner* — Sizo B Vilakazi
(74) *Attorney, Agent, or Firm* — Slayden Grubert Beard PLLC

(57) ABSTRACT

The disclosure relates to a steering system assembly for a vehicle, for example a steer-by-wire system, in which, in particular, detection devices and implementation devices for a steering request are mechanically decoupled from one another, having: a first steering system for providing a
(Continued)

steering function, which is designed to be autonomous and/or has a first energy supply; a second steering system for providing a first fallback level for the steering function, which is designed to be autonomous and/or has a second energy supply; and a third steering system for providing a second fallback level for the steering function, in particular through selective wheel braking.

20 Claims, 1 Drawing Sheet

(51) Int. Cl.

*B60W 50/023* (2012.01)

*B62D 9/00* (2006.01)

(56) References Cited

U.S. PATENT DOCUMENTS

| | | | | |
|---|---|---|---|---|
| 12,466,374 | B2 * | 11/2025 | Wyciechowski | B62D 11/08 |
| 2002/0189889 | A1 | 12/2002 | Demerly | 180/402 |
| 2004/0128042 | A1 * | 7/2004 | Takahashi | B62D 5/0403 180/443 |
| 2016/0325721 | A1 * | 11/2016 | Jonasson | B60T 8/171 |
| 2019/0077443 | A1 * | 3/2019 | Choi | H02P 29/0241 |
| 2019/0359226 | A1 * | 11/2019 | Ochida | B60W 50/04 |
| 2021/0053537 | A1 * | 2/2021 | Braswell | B60T 11/21 |

FOREIGN PATENT DOCUMENTS

| | | | | |
|---|---|---|---|---|
| DE | 102020103660 | A1 | 8/2021 | B60W 30/02 |
| EP | 3611076 | A1 | 2/2020 | B62D 5/00 |
| JP | 2017077832 | A | 4/2017 | B62D 5/04 |
| WO | 01/72571 | A2 | 10/2001 | B62D 5/00 |
| WO | 2023/156582 | A1 | 8/2023 | B62D 5/00 |

OTHER PUBLICATIONS

International Preliminary Report on Patentability, Application No. PCT/EP2023/054008, 18 pages, Aug. 20, 2024.

International Search Report and Written Opinion, Application No. PCT/EP2023/054008, 22 pages, May 31, 2023.

* cited by examiner

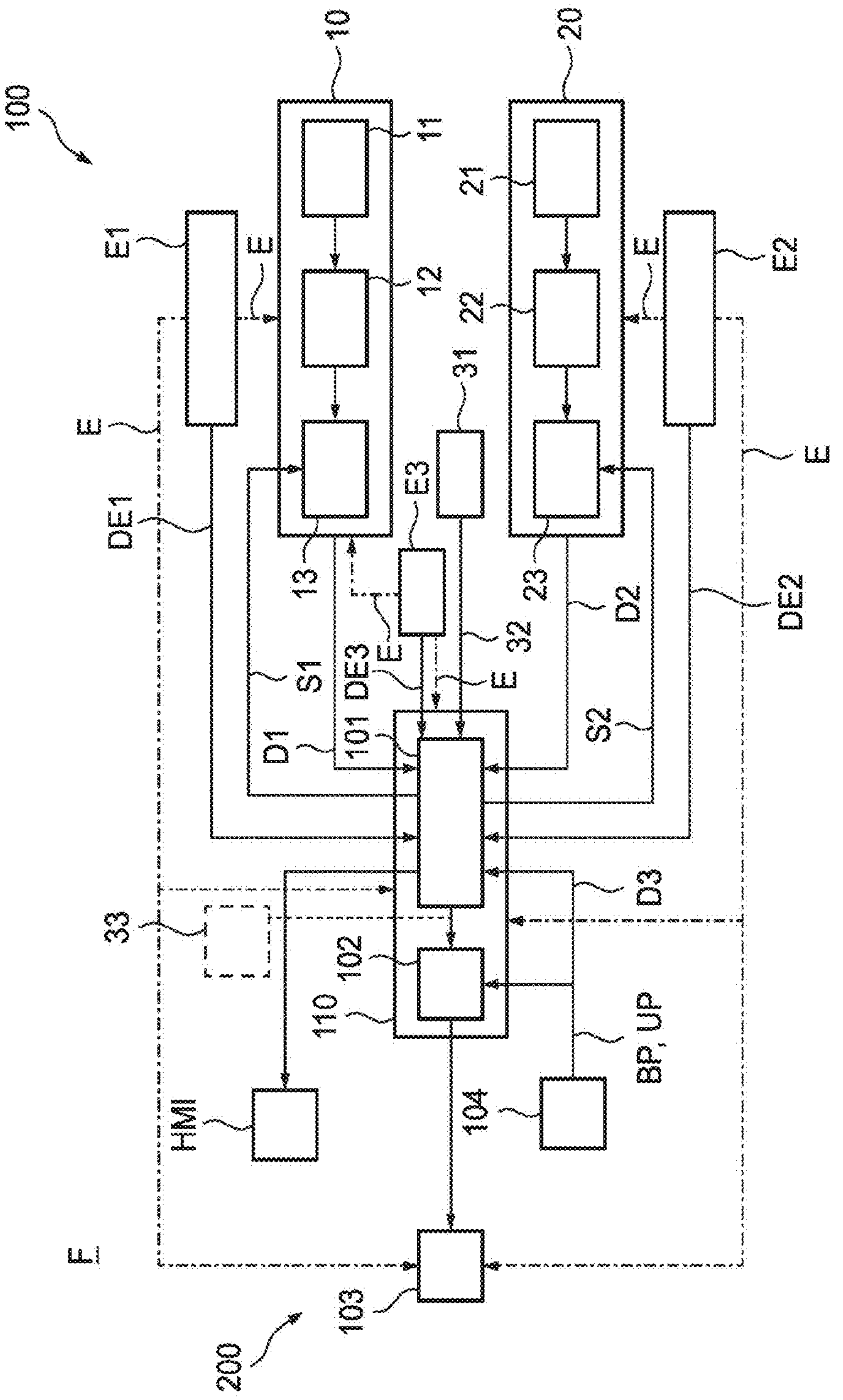
100
10
11
12
13
20
21
22
23
E1
E2
E3
E
DE1
DE2
DE3
S1
S2
D1
D2
D3
31
32
33
101
102
103
104
110
HMI
BP, UP
200

STEERING SYSTEM ASSEMBLY AND VEHICLE COMPRISING A STEERING SYSTEM ASSEMBLY

CROSS-REFERENCE TO RELATED APPLICATIONS

This application claims priority to German Patent Application No. DE 10 2022 103 808.4, filed on Feb. 17, 2022 with the German Patent and Trademark Office. The contents of the aforesaid Patent Application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The disclosure relates to a steering system assembly for a vehicle, in particular a steer-by-wire system, in which in particular detection devices and implementation devices for a steering request are mechanically decoupled from one another. The disclosure also relates to a vehicle with a corresponding steering system assembly.

Steer-by-wire systems are known in principle. Steer-by-wire systems can provide many benefits, both for conventional vehicles and for automated (Level 4 according to the SAE definition) to autonomous (Level 5 according to the SAE definition) vehicles.

For automated vehicles, steer-by-wire systems can enable the steering wheel to be folded away and/or retracted. This creates more space for the driver, who becomes a passenger during the fully automated drive, for activities such as sleeping, reading the newspaper, surfing the internet, etc. Folding away and retracting the steering wheel also enables new interior concepts with, for example, rotatable seats and tables that fold out. In addition, the mechanical decoupling between the steering wheel and the steering actuator prevents unwanted incorrect operation during fully automated driving: Even if the steering wheel has not been folded away and/or retracted, accidental contact with the steering wheel during fully automated driving (for example, while the driver is sleeping) does not lead to an unwanted vehicle reaction. Autonomous vehicles are not intended to have a driver, so a steer-by-wire system is required.

For conventional vehicles, steer-by-wire systems can simplify entering and exiting the vehicle by folding away and/or retracting the steering wheel. A variable transmission ratio between the steering wheel angle and the steering angle at the wheels, which is adapted to the vehicle speed, means that the steering wheel only has to be rotated slightly during parking and maneuvering to set the large steering angle required in this situation. In a steer-by-wire system with what is known as a “force feedback actuator,” the haptic feedback/the “steering wheel response” to the driver can be set to be softer or harder, sportier or more comfortable, direct or dampened. These settings can be transferred from vehicle to vehicle individually for the driver.

In addition, the vehicles can be easily designed to be disability-accessible. For people with physical disabilities that make operating the steering wheel difficult or impossible, standard installation of steer-by-wire systems allows alternative operating concepts to be offered without costly vehicle alterations.

In steer-by-wire systems, the mechanical fallback level of the driver is eliminated. In order to enable the drive to continue in a downgraded driving mode (e.g., reduced speed) and/or in a limited manner (e.g., only for a a limited time or a limited distance) after an initial error in a vehicle with a steer-by-wire system, a fallback level can be maintained.

A disadvantage in known systems is that, after a second error and/or after the fallback of the primary steering system and furthermore of the secondary steering system, it can no longer be guaranteed that the drive can continue and that operation will be safe.

SUMMARY

A need exists to provide an improved steering system for a vehicle.

The need is addressed by the subject matter of the independent claim(s). Embodiments of the invention are described in the dependent claims, the following description, and the drawing.

BRIEF DESCRIPTION OF THE DRAWING

The single FIGURE shows an example steering system assembly in the context of the present disclosure.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, provided is a steering system assembly for a vehicle, in particular a steer-by-wire system, in which for example detection devices and implementation devices for a steering request are mechanically decoupled from one another. Some embodiments also relate to a corresponding vehicle.

Features that are described in association with the individual aspects and/or embodiments of the disclosure also apply in association with the other aspects and/or embodiments and vice versa, so that mutual reference will always be made, or respectively can always be made, with regard to the disclosure of the individual aspects and/or embodiments.

Some embodiments provide a steering system assembly, known as a steer-by-wire system, for a vehicle, for example, a hybrid or electric vehicle, for example, an automated (Level 4 according to the SAE definition) to autonomous (Level 5 according to the SAE definition) vehicle. In the steering system assembly, detection devices and implementation devices for a steering request (which can come, for example, from the driver or from the vehicle) can beneficially be decoupled from one another. The steering system assembly has the following subsystems:

- a first (or, respectively, primary) steering system (known as an autonomous steering system) for providing a steering function,
- which is designed to be autonomous and/or has a first (or, respectively, primary) energy supply,
- a second (or, respectively, secondary) steering system (known as an autonomous steering system) for providing a first fallback level for the steering function,
- which is designed to be autonomous and/or has a second (or, respectively, secondary) energy supply,
- and a third steering system (an at least partially indirect and/or functionally implemented steering system) for providing a second fallback level for the steering function, in particular through selective, possibly pulsed, wheel braking (for example through selective, possibly pulsed, wheel braking interventions).

The vehicle in which the steering system assembly is used can have, for example, a brake system, for example a brake-by-wire system, in which detection devices and implementation devices for a braking request (which can come, for example, from the driver or from the vehicle) can beneficially be mechanically decoupled from each other. The vehicle can also have at least one central control unit. Furthermore, the vehicle can have a driver/vehicle interface, for example, in the form of an interactive input and output unit comprising, for example, a display, an acoustic output device, etc.

The vehicle comprising the steering system assembly can for example be designed as a fully automated vehicle (Level 4 according to the SAE definition) or an autonomous vehicle (Level 5 according to the SAE definition).

When the driver has control of the vehicle, the steering request can then come from the driver, for example, by actuating an electronic brake pedal. When the vehicle has control of the vehicle, then the steering request comes from the vehicle.

In a fully automated vehicle (Level 4 according to the SAE definition), the driver can become a passenger or, respectively, user of the vehicle. In a fully automated vehicle, a driver/vehicle interface can be provided. An autonomous vehicle (Level 5 according to the SAE definition) is not intended to have a driver. In this case, only users are intended. In an autonomous vehicle, a user/vehicle interface can be provided.

An idea in this case is that two redundantly maintained autonomous steering systems are provided in the steering system assembly, which are designed to be autonomous or, respectively, independent and which can function independently from one another and from other functional systems of the vehicle. The first and the second autonomous steering system can be supplied with electrical energy by two energy supplies that are independent from one another, the first and the second energy supply. The independent energy supplies can each have, for example, a high-voltage battery, which can be operated with DC voltages of approx. 60 V to approx. 1.5 kV. In addition, the independent energy supplies can each have a suitable DC/DC converter.

Each of these two steering systems can also have a plurality of subsystems, such as one steering request detector (or, respectively, detection device for detecting the steering request) each and one steering request implementer (or, respectively, implementation device for implementing the steering request) each. In both autonomous steering systems, the steering request can be transmitted from the applicable detector to the applicable implementer via a corresponding transmission system, such as a bus system or, respectively, a data bus, for example, with a CAN or SENT protocol.

The respective steering request detector can be designed as a steering column module. The actuation of the steering wheel by the driver can be detected by steering wheel angle sensors on the steering wheel. A control electronics system of the applicable steering request detector, comprising, for example, a corresponding electronics system and/or software, can passively obtain, actively query, and possibly analyze the sensor data. The control electronics system of the applicable steering request detector can also transfer the sensor data and/or the results of the analysis to the corresponding steering request implementer via an associated transmission system. Each steering request implementer can also have a control electronics system, comprising, for example, a corresponding electronics system and/or software. The analysis of the sensor data the respective steering request detector can be performed in the control electronics system of the steering request detector and/or in the control electronics system of the steering request implementer. The control electronics system of the steering request detector and the control electronics system of the steering request implementer can be provided as separate a control electronics system or as a common control electronics system.

The respective steering request implementer can be designed as a steering gear, which can be installed, for example, on a vehicle axle, for example, front axle. A control electronics system of the steering request implementer, comprising, for example, a corresponding electronics system and/or software, can control an electric motor and steering gear in order to implement the detected steering request. On the vehicle axle, for example, front axle, sensors can be provided, which monitor the control, in particular the implemented steering request. The control electronics system and the sensors can be connected to one another by a data line. The control electronics system implements the steering request, beneficially taking sensor data into consideration.

In addition to the first and the second autonomous steering system, which can have their own long-term energy supplies, a short-term energy supply can also be provided. The third steering system uses selective wheel braking and the applicable control unit of the first and/or the second brake system. The high-voltage battery, in particular the traction battery, feeds the first energy supply and the second energy supply. The first brake system is connected to the first energy supply and to the short-term energy supply. The second brake system is connected to the second energy supply. The short-term energy supply can be a part of the third steering system. The applicable long-term energy supply can take place, for example, via a DC/DC converter, which can be connected to a corresponding high-voltage battery. The short-term energy supply can take place, for example, via a low-voltage battery and/or a supercapacitor, also called an ultra-cap, or similar. The operating voltage of the low-voltage battery can be in the range between 12 V and 14 V.

An idea is also that the third steering system can be provided at least partially as an indirect or, respectively, dependent and/or functionally implemented or, respectively, indirect steering system for providing a second fallback level for the steering function, for example, via an additional functionally essential system of the vehicle, such as a brake system, for example, through selective, possibly pulsed, wheel braking. The brake system acts in this case as a third steering request implementer (or, respectively, implementation device for implementing the steering request).

The third steering system can comprise a third steering request detector. The third steering request detection can take place, for example, via a wheel third steering angle sensor. Alternatively or additionally, the third steering request detector can use a driver assistance system, for example, a lane departure warning system, road line detector, autopilot, etc. The third steering request detector can be connected directly to a control unit by a signal line. The control unit can control the first, the second, or the third steering request implementer. In the event of a critical error, the vehicle can be automatically steered to the side of the road. If steering is not possible, then the vehicle can be decelerated and/or braked, for example to a stop, for example, in the middle of the lane.

The steering system assembly can have its own control unit, which can be in a communication connection with a central control unit of the vehicle. It is also conceivable for the steering system assembly to have its own control unit, which can be integrated into the central control unit of the vehicle by means of software and/or hardware.

Since the subsystems have multiple components, the failure of one of these components can lead to the failure of the applicable subsystem. For example, a failure of an electronics system, a sensor, or software can lead to the failure of the primary or secondary steering request detector. For example, a failure of an electronics system, a sensor, software, or an electric motor can lead to a failure of the primary or secondary steering request implementer. For example, a failure of an energy line, a battery, a DC/DC converter, a fuse, an electronics system, or software can lead to the failure of the primary or the secondary energy supply. The failure of a data bus, such as the failure of the data bus between the steering request detector and the steering request implementer, can also lead to the failure of the primary or secondary steering system.

The control unit can obtain diagnostics messages, "alive" signals, and/or error states both from the first and from the second autonomous steering system and from the third indirect steering system as well as from the first and the second energy supply and from the third energy supply, for example, via a suitable transmission system, such as a bus system or, respectively, a data bus, for example, with a CAN or SENT protocol, for example, via a CAN bus, and/or a wireless transmission, such as a radio transmission. Furthermore, the control unit can obtain operating parameters of the vehicle, such as speed, load state, etc. In addition, the control unit can obtain environmental parameters, such as in particular road condition (snow, ice, degree of wetness, dryness, coefficient of friction), temperature, humidity, etc.

Based on these input signals (diagnostics messages and/or error states, operating parameters of the vehicle and/or environmental parameters), the control unit can decide whether steering through selective wheel braking pulses is possible, and/or whether it is possible to continue driving the vehicle after an initial or second error in the steering system or in the energy supplies, and/or whether steering to the side of the road is possible, and/or whether automatically decelerating to a stop is required, and/or whether this should take place based on the third steering request detector after a failure of the primary and secondary steering request detector.

If necessary, the control unit can request that the control unit of the brake system steers through selective wheel braking pulses and/or decelerates and/or brakes the vehicle. If necessary, the control unit can send the steering request to the control unit of the brake system.

The control unit of the steering system assembly and the control unit of the brake system can be provided as a common unit or as two separate control units.

In addition, the control unit can control the control unit of the driver/vehicle interface in order to inform and/or warn the driver about the errors and/or to output a recommendation for continued operation of the vehicle, such as visiting a workshop. In addition, the control unit can inform the driver about the remaining driving distance and/or about the remaining driving time.

In the following, some error cases will be described by way of example, from which the benefits of the steering system assembly after a single error in one of the steering systems become apparent. The benefits are, in particular, that it can be ensured that the vehicle can continue to drive. The vehicle continuing to drive after a single error is possible because, after a single error, there are still two options to allow continued operation of the vehicle, for example, to detect and implement a driver's steering request.

- A relevant error case is the failure of the primary or secondary steering request detector. In this error case, the redundant detection of the steering request continues to be ensured by the remaining secondary or primary steering request detector and the third steering request detector. The vehicle can continue to drive at least to a limited degree, for example, for a specific time and/or for a specific distance. The driver can be informed of this by the driver/vehicle interface.
- Another relevant error case is the failure of the primary or secondary steering request implementer when steering through selective wheel braking pulses is possible at the same time. The control unit checks whether steering is possible through selective wheel braking pulses using vehicle and road condition data. In this error case, the redundant implementation of the steering request continues to be ensured by the remaining secondary or primary steering request implementer and the steering through selective wheel braking pulses. The vehicle can continue to drive at least to a limited degree, for example, for a specific time and/or for a specific distance. The driver can be informed of this by the driver/vehicle interface.
- Another relevant error case is the failure of the first or second long-term energy supply for the first or the second steering system. In the event of a failure of the first long-term energy supply, the energy supply of the first steering system continues to be ensured for a short time by the third energy supply and the energy supply of the secondary steering system continues to be ensured by the second long-term energy supply. In the event of a failure of the second long-term energy supply, the energy supply of the first steering system continues to be ensured by the first long-term energy supply and for a short time by the third energy supply. The vehicle can continue to drive at least to a limited degree, for example, for a specific time and/or for a specific distance. The driver can be informed of this by the driver/vehicle interface.

In the following, some error cases will be described by way of example, from which the benefits of the steering system assembly after a double error in one of the steering systems become apparent. The benefits are in particular that, after a double error, the vehicle can be decelerated to a safe state, for example to a stop, through selective wheel braking and/or by automatic braking. This is possible after a double error because, after a double error, there is still at least one option to detect and/or implement the steering request and/or to decelerate the vehicle automatically and/or due to a braking request.

A relevant error case is the simultaneous failure of the primary and the secondary steering system when steering through selective wheel braking pulses is possible at the same time. The control unit checks whether steering is possible through selective wheel braking pulses using vehicle and road condition data. In this error case, the steering request is implemented by the remaining third steering request implementer, in particular through selective wheel braking pulses. For this purpose, the control unit requests that the control unit of the brake system steers via selective wheel braking pulses, and sends the steering request to the control unit of the brake system. The control unit of the brake system then controls the brake system in a suitable manner, beneficially using vehicle and road condition data. The control unit can also request that the brake system automatically decelerates and/or emergency brakes to a stop. The driver can be informed and/or warned about this by the driver/vehicle interface.

Another relevant error case is the simultaneous failure of the first and the second energy supply for the first and the second steering system. In this error case, the energy supply of the control unit and of the first steering system is ensured for a short time by the third energy supply. In this error case, the control unit requests that the brake system immediately brakes and/or emergency brakes to a stop. The driver can be informed and/or warned about this by the driver/vehicle interface.

A relevant error case is the failure of either the primary or the secondary steering request implementer when steering the vehicle through selective wheel braking pulses is not possible or is no longer possible at the same time. "No longer possible" means: While the vehicle continues to drive, the vehicle or road condition changes such that steering through selective wheel braking pulses is no longer possible. The control unit detects whether steering the vehicle is possible through selective wheel braking pulses depending on the vehicle state and road condition. Possible causes that prevent steering the vehicle through selective wheel braking pulses are, for example:

Vehicle speed is too low, and/or

Coefficient of friction between tires and road is too low.

In this error case, the control unit requests that the control unit of the brake system automatically brakes and/or emergency brakes to a stop. The driver can be informed and/or warned about this by the driver/vehicle interface.

Another relevant error case is the failure of the primary or secondary steering request detector when no third steering request detection is possible because no third steering wheel angle sensor is installed, and also no automatic steering with the aid of a driver assistance system is possible; the control unit then requests that the control unit of the brake system automatically brakes and/or emergency brakes to a stop. The driver can be informed and/or warned about this by the driver/vehicle interface.

As already indicated above, it can be beneficial if the third steering system can be implemented at least partially functionally by another functionally essential system of the vehicle, in particular by a brake system and/or a driver assistance system. In this way, existing resources in the vehicle can be used to provide a second fallback level for providing the braking function. In this case, the first or, respectively, primary steering system provides the steering function in the normal case. The second or, respectively, secondary steering function provides the first fallback level for providing the steering function. The third (at least partially indirect) steering system provides the second fallback level, functionally or, respectively, indirectly via another functionally essential system of the vehicle.

Beneficially, the third steering system can be designed to provide the steering function through selective wheel braking. In this way, a brake system of the vehicle can be used in a way not only to brake/decelerate, but also to steer the vehicle. The brake system can thereby serve as a third implementation device for implementing the steering request.

Furthermore, the third steering system can have a third detection device to detect the steering request. In this way, the third (at least partially indirect) steering system can provide both a steering request detector (or, respectively, detection device for detecting the steering request) and a steering request implementer (or, respectively, implementation device for implementing the steering request). The detection device for detecting the steering request in the third steering system is the third detection device. The implementation device for implementing the steering request in the third steering system can for example be a brake system of the vehicle.

Beneficially, the third detection device can have a third steering wheel angle sensor for detecting the steering request. In this way, another fallback level for detecting the steering request can be simply and cost-effectively provided.

In addition, the third detection device can be implemented at least partially functionally by another functionally essential system of the vehicle, in particular by a driver assistance system, for example a lane departure warning system, an autopilot, etc. In this way, another fallback level for detecting the steering request can be provided by existing resources in the vehicle.

It can also be provided that the third detection device has a third transmission system for forwarding the detected steering request to a control unit. In addition, a first signal line can be provided, which is designed to forward the detected steering request from the control unit to the first steering system. A second signal line can also be provided, which is designed to forward the detected steering request from the control unit to the second steering system. In this way, the control unit in the second fallback level can obtain the steering request.

Furthermore, a third energy supply can be provided at least for the first steering system. For example, the third energy supply can be designed to supply a control unit. In this case, it is conceivable for the third energy supply to be designed as a short-term energy supply, in particular comprising a low-voltage battery and/or a supercapacitor. Thus, in the steering system assembly, three energy supplies, two long-term energy supplies and one short-term energy supply, can be provided in order to enable steering of the vehicle in the case of a single error or even in the case of a double error in one of the energy supplies.

As already indicated above, the first steering system or, respectively, the primary steering system can be designed to be autonomous and act independently and autonomously from other systems in the vehicle. For this purpose, the first steering system can have a first detection device for detecting the steering request, a first implementation device for implementing the steering request, and/or a first transmission system for forwarding the detected steering request from the first detection device to the first implementation device. In addition, the first steering system can have at least one control electronics system for a first detection device, a first implementation device, and a first transmission system.

As likewise indicated above, the second steering system or, respectively, the secondary steering system can also be designed to be autonomous and act independently and autonomously from other systems in the vehicle. For this purpose, the second steering system can have a second detection device for detecting the steering request, a second implementation device for implementing the steering request, and/or a second transmission system for forwarding the detected steering request from the second detection device to the second implementation device. In addition, the second steering system can have at least one control electronics system for a second detection device, a second implementation device, and a second transmission system.

The first energy supply can be designed as a long-term energy supply comprising, for example, a high-voltage battery and/or a DC/DC converter. The second energy supply can be designed as a long-term energy supply comprising, for example, a high-voltage battery and/or a DC/DC converter.

In addition, it is conceivable for the first energy supply and/or the second energy supply to be designed to supply a control unit. In this way, the first energy supply and/or the second energy supply can be used cross-functionally.

It is also conceivable for the first steering system to be connected by means of signals, for example, via a transmission system such as a bus system, to a control unit, for example, for transmitting diagnostic data.

In addition, it is also conceivable for the first steering system to be connected by means of control technology, for example, via a transmission system such as a bus system, to a control unit for executing a steering request, which was detected in particular by a third detection device.

However, the second steering system can also be connected by means of signals, for example, via a transmission system such as a bus system, to a control unit, for example, for transmitting diagnostic data.

Furthermore, the second steering system can be connected by means of control technology, for example, via a transmission system such as a bus system, to a control unit for executing a steering request, which was detected in particular by a third detection device.

Beneficially, the first energy supply can be connected by means of signals, for example, via a transmission system such as a bus system, to a control unit, for example, for transmitting diagnostic data.

It can also be beneficial for the second energy supply to be connected by means of signals, for example, via a transmission system such as a bus system, to a control unit, for example, for transmitting diagnostic data.

As already explained above, a control unit can be provided in the steering system assembly. The control unit can be integrated, for example, into a central control unit of the vehicle by means of software and/or hardware. Alternatively, it is conceivable that the control unit can be provided as a separate control unit.

For example, the control unit is designed to query, receive, and/or process

- Diagnostic data from the first steering system,
- Diagnostic data from the second steering system,
- Diagnostic data from the third steering system,
- Diagnostic data from the first energy supply,
- Diagnostic data from the second energy supply,
- Diagnostic data from the third energy supply, and/or
- At least one operating parameter of the vehicle, in particular speed, load state, etc., and/or
- At least one environmental parameter, in particular road condition, coefficient of friction, temperature, humidity, etc.

In this way, the control unit can decide whether the steering systems are functional, whether an error is present, whether a double error is present, and/or whether selective wheel braking of the vehicle is possible.

The control unit can also be designed

- to control the first steering system and/or the second steering system to execute the steering request.

The control may for example take place depending on diagnostic data from the first steering system, from the second steering system, from the third steering system, from the first energy supply, from the second energy supply, from the third energy supply, at least one operating parameter of the vehicle, in particular speed, load state, etc., and/or at least one environmental parameter, in particular road condition, coefficient of friction, temperature, humidity, etc.

The control unit can also be designed

- to control another functionally essential system of the vehicle, in particular a brake system, in order to provide the steering function through selective wheel braking.

The control may for example take place depending on diagnostic data from the first steering system, from the second steering system, from the third steering system, from the first energy supply, from the second energy supply, from the third energy supply, at least one operating parameter of the vehicle, in particular speed, load state, etc., and/or at least one environmental parameter, in particular road condition, coefficient of friction, temperature, humidity, etc.

In addition, the control unit can be designed

- to control a driver/vehicle interface in order to inform and/or warn a driver about errors and/or to output a recommendation for continued operation of the vehicle, such as visiting a workshop. In the case of an autonomous vehicle, the driver/vehicle interface can be referred to as a user/vehicle interface or a passenger/vehicle interface.

The control unit can also be designed

- To inform a driver about a remaining driving distance and/or about a remaining driving time.

The brake system or, respectively, the brake-by-wire system, which is used for selective wheel braking, can have:

- A first brake system for providing a braking function, which is designed to be autonomous and/or has the first energy supply,
- A second brake system for providing a first fallback level for the braking function, which is designed to be autonomous and/or has the second energy supply,
- And a third brake system for providing a second fallback level for the braking function, particular by in regenerative deceleration.

In this case, the third brake system can be implemented at least partially functionally by another functionally essential system of the vehicle, in particular by an electromechanical drive system and/or an electronic parking brake.

The third brake system can be designed to provide the braking function through regenerative deceleration.

Furthermore, the third brake system can have a third detection device for detecting the braking request. In this case, it is conceivable for the third detection device to have a button of an electronic parking brake and/or: third detection device to be implemented at least partially functionally by another functionally essential system of the vehicle, in particular by an electronic parking brake, for example a button of an electronic parking brake.

Furthermore, the third detection device can be connected by means of signal technology via a first signal line, in particular directly, to a first implementation device of the first brake system. The third detection device can also be connected by means of signal technology via a second signal line, in particular directly, to a second implementation device of the second brake system.

The third energy supply can also be used for the first brake system.

The disclosure also provides a vehicle with a steering system assembly and possibly a brake system or, respectively, a brake-by-wire system, which can be designed as described above. Using the vehicle, the same benefits as those described above in relation to the steering system assembly can be achieved. Reference is made to all of these benefits in the present case.

The steering system is discussed in greater detail below with reference to an embodiment according to the drawing. Specific references to components, process steps, and other elements are not intended to be limiting. Further, it is understood that like parts bear the same or similar reference numerals when referring to alternate FIGS.

The FIGURE shows a steering system assembly 100 in the context of the present disclosure, which can be designed in the form of a steer-by-wire system for a vehicle F, for example, a hybrid or electric vehicle, for example, an automated (Level 4 according to the SAE definition) to autonomous (Level 5 according to the SAE definition) vehicle. In the steering system assembly 100 in the context of the present disclosure, detection devices 11, 21, 31 and implementation devices 13, 23, 33 for a steering request (which can come, from the driver or from the vehicle) can be mechanically decoupled from one another.

The steering system assembly 100 has the following subsystems 10, 20, 30:

A first (or, respectively, primary) steering system 10 (known as an autonomous steering system) for providing a steering function, which is designed to be autonomous and/or has a first (or, respectively, primary) energy supply, A second (or, respectively, secondary) steering system 20 (known as an autonomous steering system) for providing a first fallback level for the steering function, which is designed to be autonomous and/or has a second (or, respectively, secondary) energy supply, And a third steering system 30 (an at least partially indirect and/or functionally implemented steering system) for providing a second fallback level for the steering function, in particular through selective, possibly pulsed, wheel braking or, respectively, through selective, possibly pulsed, wheel braking interventions, for example via a brake system 103 of the vehicle F.

The vehicle F in which the steering system assembly 100 can be used can have, for example, a brake system 103, for example a brake-by-wire system. In the brake system 103, detection devices and implementation devices for a braking request (which can come, for example, from the driver or from the vehicle) can be mechanically decoupled from one another.

The vehicle F can also have at least one central control unit 110. Furthermore, the vehicle can have a driver/vehicle interface HMI, for example, in the form of an interactive input and output unit comprising, for example, a display, an acoustic output device, etc.

As the FIGURE illustrates, two redundantly maintained autonomous steering systems 10, 20 are provided in the steering system assembly 100. The steering systems 10, 20 are designed to be autonomous or, respectively, independent and can be operated independently of one another and from other functional systems of the vehicle F.

The steering systems 10, 20 can be supplied with electrical energy E, as is indicated in the FIGURE with dashed-dotted lines, by two energy supplies E1, E2 that are independent of one another. The energy supplies E1, E2 can each have a high-voltage battery, which can be operated with DC voltages of approx. 60 V to approx. 1.5 kV, and each have a suitable DC/DC converter.

Each of the steering systems 10, 20 can also have multiple subsystems 11, 12, 13 and 21, 22, 23, such as one steering request detector (or, respectively, detection device 11, 21 for detecting the steering request) each and one steering request implementer (or, respectively, implementation device 13, 23 for implementing the steering request) each and a corresponding transmission system 12, 22, such as a bus system or, respectively, a data bus, for example, with a CAN, or SENT protocol, can be transmitted.

The respective detection device 11, 21 can be designed as a steering column module. The actuation of the steering wheel by the driver can be detected by steering wheel angle sensors on the steering wheel. A control electronics system of each detection device 11, 21, comprising, for example, a corresponding electronics system and/or software, can passively obtain, actively query, and possibly analyze the sensor data. The control electronics system of each detection device 11, 21 can also transfer the sensor data and/or the results of the analysis to the corresponding implementation device 13, 23 via an associated transmission system 12, 22. The respective implementation device 13, 23 can also have a control electronics system, comprising, for example, a corresponding electronics system and/or software. The analysis of sensor data of each detection device 11, 21 can be performed in the control electronics system of the detection device 11, 21 and/or in the control electronics system of the implementation device 13, 23. The control electronics system of the detection device 11, 21 and the control electronics system of the implementation device 13, 23 can be provided as separate control electronics systems or as a common control electronics system.

Each implementation device 13, 23 can be designed as a steering gear, which can be installed, for example, on a vehicle axle, for example, front axle. A control electronics system of the implementation device 13, 23, comprising, for example, a corresponding electronics system and/or software, can control an electric motor and a steering gear in order to implement the detected steering request. On the vehicle axle, for example, front axle, sensors can be provided, which can monitor the control, in particular the implemented steering request. The control electronics system of the implementation device 13, 23 and the sensors can be connected to one another by a data line. The control electronics system of the implementation device 13, 23 can implement the steering request, beneficially taking this sensor data into consideration.

The first steering system 10 and the second steering system 20 each have their own energy supply E1, E2, in particular a long-term energy supply. The third steering system 30 can also have a third energy supply E3, in particular a short-term energy supply. Each long-term energy supply E1, E2 can have, for example, a DC/DC converter, which can be connected to a corresponding high-voltage battery. The short-term energy supply E3 can have, for example, a low-voltage battery and/or a supercapacitor, also called an ultra-cap, or similar.

An idea is that the third steering system 30 can be provided at least partially as an indirect or, respectively, dependent and/or functionally implemented or, respectively, indirect steering system 30 for providing a second fallback level for the steering function. This can for example take place via another functionally essential system 200 of the vehicle F, such as a brake system 103, for example, through selective, possibly pulsed, wheel braking of the vehicle F. The brake system 103 can thus be used in this case as a third steering request implementer (or, respectively, implementation device 33 for implementing the steering request).

The third steering system 30 can comprise its own, meaning a third, detection device 31. The third detection device 31 can use a third steering wheel angle sensor. Alternatively or additionally, the third detection device 31 can use a driver assistance system, for example, a lane departure warning system, road line detector, autopilot, etc. The third detection device 31 can have a third transmission system 32 for forwarding the detected steering request to a control unit 101. The control unit 101 can control the first, the second, or the third steering request implementer. In the event of a critical error, the control unit 101 can automatically steer the vehicle F to the side of the road. If steering is not possible, then the control unit 101 can decelerate and/or brake the vehicle, if possible to a stop, for example, in the middle of the lane.

The steering system assembly 100 can have its own control unit 101, which can be in a communication connection with a central control unit 110 of the vehicle F. As the FIGURE indicates, the steering system assembly 100 can have a control unit 101, which can be integrated into the central control unit 110 of the vehicle F by means of software and/or hardware.

Since the subsystems of the two autonomous steering systems 10, 20 have multiple components, the failure of one of these components can lead to a partial or complete failure of the steering systems 10, 20. A failure of one of the brake systems 10, 20 can be due to a failure of an energy line, a data bus, a battery, a DC/DC converter, a fuse, software, a sensor, an actuator, a valve, a control element, etc.

The control unit 101 can obtain diagnostic data D1, D2, D3, DE1, DE2, DE3, "alive" signals, and/or error states both from the first autonomous steering system 10 and from the second autonomous steering system 20 and from the third indirect steering system L3 as well as from the first energy supply E1 and the second energy supply E2 and from the third energy supply E3, for example, via a suitable transmission system, such as a bus system or, respectively, a data bus, for example, with a CAN or SENT protocol, for example, via a CAN bus, and/or a wireless transmission, such as a radio transmission. Furthermore, the control unit 101 can take into consideration operating parameters BP of the vehicle F, such as speed, load state, etc. In addition, the control unit 101 can take into account environmental parameters UP, such as in particular road condition (snow, ice, degree of wetness, dryness, coefficient of friction), temperature, humidity, etc.

Using the diagnostic data D1, D2, D3, DE1, DE2, DE3 of the operating parameters BP of the vehicle F and/or the environmental parameters UP, the control unit 101 can decide whether steering through selective wheel braking pulses is possible.

Using the diagnostic data D1, D2, D3, DE1, DE2, DE3 of the operating parameters BP of the vehicle F and/or the environmental parameters UP, the control unit 101 can decide whether it is possible to continue driving the vehicle F after an initial or second error in the steering systems 10, 20 or in the energy supplies E1, E2.

Using the diagnostic data D1, D2, D3, DE1, DE2, DE3 of the operating parameters BP of the vehicle F and/or the environmental parameters UP, the control unit 101 can decide whether steering to the side of the road is possible and/or whether automatic deceleration and/or braking to a stop is required.

Using the diagnostic data D1, D2, D3, DE1, DE2, DE3 of the operating parameters BP of the vehicle F and/or the environmental parameters UP, the control unit 101 can decide whether the steering request detection should take place using the third steering request detector after a failure of the primary and second steering request detector.

The control unit 101 can request that the control unit 102 of the brake system 103 steers through selective wheel braking pulses and/or decelerates and/or brakes the vehicle F. The control unit 101 can send, if necessary, the steering request, which can be translated into corresponding selective wheel braking pulses, to the control unit 102 of the brake system 103.

The control unit 101 of the steering system assembly 100 and the control unit 102 of the brake system 103 can be provided as a common unit or as two separate control units.

In addition, the control unit 101 can control the driver/vehicle interface HMI in order to inform and/or warn the driver about the errors and/or to output a recommendation for continued operation of the vehicle F, such as visiting a workshop, driving to the side of the road, and/or braking the vehicle. In addition, the control unit can inform the driver about the remaining driving distance and/or about the remaining driving time.

The brake system or, respectively, the brake-by-wire system, which is used for selective wheel braking, can have:

- A first brake system for providing a braking function, which is designed to be autonomous and/or has the first energy supply E1,
- A second brake system for providing a first fallback level for the braking function, which is designed to be autonomous and/or has the second energy supply E2,
- And a third brake system for providing a second fallback level for the braking function, in particular by regenerative deceleration.

In this case, the third brake system can be implemented at least partially functionally by another functionally essential system 200 of the vehicle F, in particular by an electromechanical drive system and/or an electronic parking brake.

Beneficially, the third brake system can be designed to provide the braking function through regenerative deceleration.

Furthermore, the third brake system can have a third detection device for detecting the braking request. In this case, it is conceivable for the third detection device to have a button of an electronic parking brake and/or for the third detection device to be implemented at least partially functionally by another functionally essential system of the vehicle F, in particular by an electronic parking brake, For example a button of an electronic parking brake.

The third detection device can also be connected by means of signal technology via a first signal line, in particular directly, to a first implementation device of the first brake system. The third detection device can also be connected by means of signal technology via a second signal line, in particular directly, to a second implementation device of the second brake system.

The third energy supply E3 can also be used for the first brake system.

In the following, examples of single errors will be described that can be handled using the steering system assembly to ensure that the vehicle F can continue to drive. The vehicle F continuing to drive after a single error is reliably possible because, after a single error, there are still two options to allow continued operation of the vehicle F, for example, to detect and implement a driver's steering request.

- A relevant error case is the failure of the primary or secondary detection device 11, 21. In this error case, the redundant detection of the steering request by the remaining secondary or primary detection device 21, 11 and the third detection device 31 continues to be ensured. The vehicle F can continue to drive at least to a limited degree, for example, for a specific time and/or for a specific distance. The driver can be informed of this by the driver/vehicle interface HMI.
- Another relevant error case is the failure of the primary or secondary implementation device 13, 23 when steering through selective wheel braking pulses is possible at the same time. The control unit 101 checks whether steering is possible through selective wheel braking pulses using vehicle and road condition data. In this error case, the redundant implementation of the steering request by the remaining secondary or primary steering request implementer 23, 13 and the steering through selective wheel braking pulses continues to be ensured. The vehicle can continue to drive at least to a limited degree, for example, for a specific time and/or for a specific distance. The driver can be informed of this by the driver/vehicle interface HMI.
- Another relevant error case is the failure of the first or second long-term energy supply E1, E2 for the first or the second steering system 10, 20. In the event of a failure of the first long-term energy supply E1, the energy supply of the first steering system 10 continues to be ensured for a short time by the third energy supply E3 and the energy supply of the secondary steering system 20 continues to be ensured by the second energy supply E2. In the event of a failure of the second long-term energy supply E2, the energy supply of the first steering system continues to be ensured by the first long-term energy supply E1 and for a short time by the third energy supply E3. The vehicle F can continue to drive at least to a limited degree, for example, for a specific time and/or for a specific distance. The driver can be informed of this by the driver/vehicle interface HMI.

In the following, several examples of double errors will be described that can be handled by the steering system assembly 100 so that the vehicle F can be steered through selective wheel braking and/or decelerated to a safe state, if possible to a stop, by automatic braking. This is possible because, after a double error, there is also still at least one option to detect and implement a steering request and/or to decelerate the vehicle F automatically and/or due to a braking request.

- A relevant error case is the simultaneous failure of the primary steering system 10 and the secondary steering system 20 when steering through selective wheel braking pulses is possible at the same time. The control unit 101 checks whether steering is possible through selective wheel braking pulses using vehicle and road condition data. In this error case, the steering request is implemented by the remaining third implementation device 33, in particular through selective wheel braking pulses, for example using the brake system 103. For this purpose, the control unit 101 requests that the control unit 102 of the brake system 103 steers using selective wheel braking pulses, and sends the steering request to the control unit 102 of the brake system 103. In this case, the control unit 101 of the steering system assembly 100 or the control unit 102 of the brake system 103 can translate the steering request into selective wheel braking pulses, beneficially using vehicle and road condition data. The control unit 102 of the brake system 103 then suitably controls the brake system 103. The control unit 101 can also request that the brake system 103 automatically decelerates and/or emergency brakes to a stop. The driver can be informed and/or warned about this by the driver/vehicle interface HMI.
- Another relevant error case is the simultaneous failure of the first energy supply E1 and the second energy supply E2 for the first and the second steering system 10, 20. In this error case, the energy supply of the control unit 101 and of the first steering system 10 is ensured for a short time by the third energy supply E3. In this error case, the control unit 101 requests that the brake system 103 immediately brakes and/or emergency brakes to a stop. The driver can be informed and/or warned about this by the driver/vehicle interface HMI.
- A relevant error case is the failure of either the primary implementation device 13 the or secondary implementation device 23 when steering the vehicle F through selective wheel braking pulses is not possible or is no longer possible at the same time. "No longer possible" means: While the vehicle continues to drive, the vehicle or road condition changes such that steering through selective wheel braking pulses is no longer possible. The control unit 101 detects whether steering the vehicle F is possible through selective wheel braking pulses depending on operating parameters BP of the vehicle F and/or the environmental parameters UP. Possible causes that prevent steering the vehicle F through selective wheel braking pulses are, for example:
  - Vehicle speed is too low, and/or
  - Coefficient of friction between tires and road is too low.

In this error case, the control unit 101 requests that the control unit 102 of the brake system 103 automatically brakes and/or emergency brakes to a stop. The driver can be informed and/or warned about this by the driver/vehicle interface HMI.

LIST OF REFERENCE NUMERALS

F Vehicle
100 Steering system assembly
10 First steering system
11 First detection device
12 First transmission system
13 First implementation device
20 Second steering system
21 Second detection device
22 Second transmission system
23 Second implementation device
30 Third steering system
31 Third detection device
32 Third transmission system
33 Third implementation device, selective wheel braking
110 Central control unit
101 Control unit
102 Control unit

200 Functionally essential system
103 Brake system
104 Vehicle and/or road condition detection
E Electrical energy
E1 First energy supply
E2 Second energy supply
E3 Third energy supply
HMI Driver/vehicle interface
S1 First signal line
S2 Second signal line
S10 Automatic braking and/or emergency braking
S20 Automatic braking and/or emergency braking
D1 Diagnostic data
D2 Diagnostic data
D3 Diagnostic data
DE1 Diagnostic data
DE2 Diagnostic data
DE3 Diagnostic data
BP Operating parameters
UP Environmental parameters The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, device, or unit may be arranged to fulfil the functions of several items recited in the claims. Likewise, multiple processors, devices, or units may be arranged to fulfil the functions of several items recited in the claims.

The term "exemplary" used throughout the specification means "serving as an example, instance, or exemplification" and does not mean "having "preferred" or advantages" over other embodiments. The terms "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A steering system assembly for a vehicle, in which detection devices and/or implementation devices for a steering request are mechanically decoupled from one another, the assembly comprising:
a first steering system for providing a steering function, which is configured to be autonomous and/or has a first energy supply;
a second steering system for providing a first fallback level for the steering function, which is configured to be autonomous and/or has a second energy supply;
and a third steering system for providing a second fallback level for the steering function, in particular through selective wheel braking;
wherein a controller is provided, wherein the controller is configured to query, receive, and/or process:
diagnostic data from the first steering system;
diagnostic data from the second steering system;
diagnostic data from the third steering system;
diagnostic data from the first energy supply;
diagnostic data from the second energy supply;
diagnostic data from a third energy supply;
at least one operating parameter of the vehicle; and
at least one environmental parameter.

2. The steering system assembly of claim 1,
wherein the third steering system is implemented at least partially functionally by another functionally essential system of the vehicle, in particular by a brake system and/or a driver assistance system,
and/or wherein the third steering system is configured to provide the steering function through selective wheel braking.

3. The steering system assembly of claim 1,
wherein the third steering system has a third detection device for detecting the steering request,
wherein in particular the third detection device has a third steering wheel angle sensor for detecting the steering request, and/or
wherein the third detection device is implemented at least partially functionally by another functionally essential system of the vehicle, in particular by a driver assistance system.

4. The steering system assembly of claim 3,
wherein the third detection device has a third transmission system for forwarding the detected steering request to the controller,
and/or wherein a first signal line is provided, which is configured to forward the detected steering request from the controller to the first steering system,
and/or wherein a second signal line is provided, which is configured to forward the detected steering request from the controller to the second steering system.

5. The steering system assembly of claim 1,
wherein a third energy supply is provided at least for the first steering system,
wherein in particular the third energy supply is configured to supply the control unit,
wherein the third energy supply is configured as a short-term energy supply, in particular comprising a low-voltage battery and/or a supercapacitor.

6. The steering system assembly of claim 1,
wherein the first steering system has a first detection device for detecting the steering request, a first implementation device for implementing the steering request, and/or a first transmission system for forwarding the detected steering request from the first detection device to the first implementation device,
and/or wherein the first steering system has at least one control electronics system for a first detection device, a first implementation device, and a first transmission system.

7. The steering system assembly of claim 1,
wherein the second steering system has a second detection device for detecting the steering request, a second implementation device for implementing the steering request, and/or a second transmission system for forwarding the detected steering request from the second detection device to the second implementation device,
and/or wherein the second steering system has at least one control electronics system for a second detection device, a second implementation device, and a second transmission system.

8. The steering system assembly of claim 1,
wherein the first energy supply is configured as a long-term energy supply, in particular comprising a high-voltage battery and/or a DC/DC converter,
and/or wherein the second energy supply is configured as a long-term energy supply, in particular comprising a high-voltage battery and/or a DC/DC converter,
and/or wherein the first energy supply and/or the second energy supply is/are configured to supply the controller.

9. The steering system assembly of claim 1, wherein the first steering system is connected by means of signals, via a transmission system such as a bus system, to a control unit, in particular for transmitting diagnostic data, and/or wherein the first steering system is connected by means of control technology, via a transmission system such as a bus system, to the controller for executing a steering request, which was detected in particular by a third detection device.

10. The steering system assembly of claim 1, wherein the second steering system is connected by means of signals, via a transmission system such as a bus system, to the controller, in particular for transmitting diagnostic data, and/or wherein the second steering system is connected by means of control technology, via a transmission system such as a bus system, to the controller for executing a steering request, which was detected in particular by a third detection device, and/or wherein the third steering system is connected by means of signals, via a transmission system such as a bus system, to the controller, in particular for transmitting diagnostic data.

11. The steering system assembly of claim 1, wherein the first energy supply is connected by means of signals, via a transmission system such as a bus system, to the controller, in particular for transmitting diagnostic data, and/or wherein the second energy supply is connected by means of signals, via a transmission system such as a bus system, to the controller, in particular for transmitting diagnostic data, and/or wherein the third energy supply is connected by means of signals, via a transmission system such as a bus system, to the controller, in particular for transmitting diagnostic data.

12. The steering system assembly of claim 1, wherein the controller is integrated into a central processor of the vehicle using software and/or hardware.

13. The steering system assembly of claim 12, wherein the controller is configured to control the first steering system and/or the second steering system to execute the steering request.

14. The steering system assembly of claim 1, wherein the controller is configured to control another functionally essential system of the vehicle, in particular a brake system, in order to provide the steering function through selective wheel braking.

15. A vehicle with a steering system assembly of claim 1.

16. The steering system assembly of claim 1, which steering system assembly is a steer-by-wire system.

17. The steering system assembly of claim 2, wherein the third steering system has a third detection device for detecting the steering request, wherein in particular the third detection device has a third steering wheel angle sensor for detecting the steering request, and/or wherein the third detection device is implemented at least partially functionally by another functionally essential system of the vehicle, in particular by a driver assistance system.

18. The steering system assembly of claim 2, wherein the third detection device has a third transmission system for forwarding the detected steering request to the controller, and/or wherein a first signal line is provided, which is configured to forward the detected steering request from the controller to the first steering system, and/or wherein a second signal line is provided, which is configured to forward the detected steering request from the controller to the second steering system.

19. The steering system assembly of claim 2, wherein a third energy supply is provided at least for the first steering system, wherein the third energy supply is configured to supply the control unit, wherein the third energy supply is configured as a short-term energy supply, in particular comprising a low-voltage battery and/or a supercapacitor.

20. The steering system assembly of claim 3, wherein a third energy supply is provided at least for the first steering system, wherein the third energy supply is configured to supply the control unit, wherein the third energy supply is configured as a short-term energy supply, in particular comprising a low-voltage battery and/or a supercapacitor.

* * * * *